United States Patent
Ananthanarayanan et al.

(10) Patent No.: US 9,176,980 B2
(45) Date of Patent: *Nov. 3, 2015

(54) SCALABLE CACHING OF REMOTE FILE DATA IN A CLUSTER FILE SYSTEM

(75) Inventors: Rajagopol Ananthanarayanan, San Jose, CA (US); Marc M. Eshel, San Jose, CA (US); Roger L. Haskin, Morgan Hill, CA (US); Dean Hildebrand, San Jose, CA (US); Manoj P. Naik, San Jose, CA (US); Frank B. Schmuck, Campbell, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/570,014

(22) Filed: Aug. 8, 2012

(65) Prior Publication Data

US 2012/0303686 A1 Nov. 29, 2012

Related U.S. Application Data

(63) Continuation of application No. 12/639,832, filed on Dec. 16, 2009.

(51) Int. Cl.
*G06F 15/16* (2006.01)
*G06F 17/30* (2006.01)

(52) U.S. Cl.
CPC ................ *G06F 17/30224* (2013.01)

(58) Field of Classification Search
CPC .............................. G06F 17/30224
See application file for complete search history.

(56) References Cited

U.S. PATENT DOCUMENTS

| | | |
|---|---|---|
| 5,175,852 A | 12/1992 | Johnson et al. |
| 5,781,757 A | 7/1998 | Deshpande |
| 5,884,046 A | 3/1999 | Antonov |
| 5,909,540 A | 6/1999 | Carter et al. |
| 5,940,841 A | 8/1999 | Schmuck et al. |
| 6,012,085 A | 1/2000 | Yohe et al. |
| 6,023,706 A | 2/2000 | Schmuck et al. |
| 6,122,629 A | 9/2000 | Walker et al. |
| 6,192,408 B1 | 2/2001 | Vahalia et al. |
| 6,219,693 B1 | 4/2001 | Napolitano et al. |
| 6,490,615 B1 | 12/2002 | Dias et al. |
| 6,535,970 B1 | 3/2003 | Bills et al. |
| 6,675,264 B2 | 1/2004 | Chen et al. |

(Continued)

OTHER PUBLICATIONS

Batsakis, A. et al., "NFS-CD: Write-Enabled Cooperative Caching in NFS," IEEE Transactions on Parallel and Distributed Systems, Mar. 2008, pp. 323-333, vol. 19, No. 3, IEEE Computer Society, USA.

(Continued)

*Primary Examiner* — Joseph Greene
(74) *Attorney, Agent, or Firm* — Sherman IP LLP; Kenneth L. Sherman; Steven Laut

(57) ABSTRACT

Scalable caching of remote file data in cluster file systems is provided. One implementation involves maintaining a cache in a local cluster file system and caching local file data in the cache by fetching file data on demand from the remote cluster file system into the local cached file system over the network. The local file data and metadata corresponds to the remote file data and metadata in the remote cluster file system. Updates made to the local file data and metadata are pushed back to the remote cluster file system asynchronously.

12 Claims, 7 Drawing Sheets

(56) References Cited

U.S. PATENT DOCUMENTS

| | | | |
|---|---|---|---|
| 6,816,891 B1 | 11/2004 | Vahalia et al. | |
| 6,938,039 B1 | 8/2005 | Bober et al. | |
| 6,950,833 B2 | 9/2005 | Costello et al. | |
| 6,965,972 B2 | 11/2005 | Nanda et al. | |
| 7,043,478 B2 | 5/2006 | Martin et al. | |
| 7,092,976 B2 * | 8/2006 | Curran et al. | 1/1 |
| 7,103,616 B1 | 9/2006 | Harmer et al. | |
| 7,165,096 B2 | 1/2007 | Soltis | |
| 7,167,921 B1 | 1/2007 | Ben-Zvi | |
| 7,177,270 B2 | 2/2007 | Sim et al. | |
| 7,376,796 B2 | 5/2008 | Corbett et al. | |
| 7,395,258 B2 | 7/2008 | Altinel et al. | |
| 7,454,653 B2 | 11/2008 | Nicholson et al. | |
| 7,552,197 B2 | 6/2009 | Soltis | |
| 7,584,222 B1 | 9/2009 | Georgiev | |
| 7,631,078 B2 | 12/2009 | Ackaouy et al. | |
| 7,650,341 B1 | 1/2010 | Oratovsky et al. | |
| 7,685,128 B2 | 3/2010 | Anderson et al. | |
| 7,739,379 B1 | 6/2010 | Vahalia et al. | |
| 7,870,116 B2 | 1/2011 | Olsen | |
| 7,877,426 B2 | 1/2011 | Grubbs et al. | |
| 7,899,917 B2 | 3/2011 | Chitre et al. | |
| 8,046,422 B2 | 10/2011 | Susarla et al. | |
| 8,209,307 B2 | 6/2012 | Erofeev | |
| 2004/0139235 A1 | 7/2004 | Rashid et al. | |
| 2004/0193620 A1 | 9/2004 | Cheng et al. | |
| 2005/0091226 A1 * | 4/2005 | Lin et al. | 707/100 |
| 2005/0097300 A1 | 5/2005 | Gildea et al. | |
| 2005/0144195 A1 | 6/2005 | Hesselink et al. | |
| 2005/0216695 A1 | 9/2005 | Bono | |
| 2006/0117018 A1 | 6/2006 | Christiansen et al. | |
| 2006/0186756 A1 * | 8/2006 | Langlois et al. | 310/317 |
| 2007/0179981 A1 | 8/2007 | Vincent | |
| 2007/0266108 A1 | 11/2007 | Patterson et al. | |
| 2008/0040450 A1 | 2/2008 | Appleyard et al. | |
| 2008/0065583 A1 * | 3/2008 | Coverston et al. | 707/1 |
| 2008/0071804 A1 * | 3/2008 | Gunda et al. | 707/100 |
| 2009/0019098 A1 * | 1/2009 | Gunda et al. | 707/205 |
| 2009/0276431 A1 | 11/2009 | Lind et al. | |
| 2010/0153415 A1 * | 6/2010 | Muntz | 707/758 |
| 2010/0198576 A1 * | 8/2010 | Dessertenne | 703/17 |
| 2010/0235321 A1 | 9/2010 | Shukla et al. | |
| 2010/0250508 A1 * | 9/2010 | Erofeev | 707/704 |
| 2011/0119228 A1 | 5/2011 | Menze et al. | |
| 2011/0138131 A1 | 6/2011 | Regni et al. | |
| 2011/0145307 A1 | 6/2011 | Ananthanarayanan et al. | |
| 2011/0145363 A1 | 6/2011 | Ananthanarayanan et al. | |
| 2011/0145499 A1 | 6/2011 | Ananthanarayanan et al. | |
| 2012/0311065 A1 | 12/2012 | Ananthanarayanan et al. | |

OTHER PUBLICATIONS

Annapureddy, S. et al., "Shark: Scaling File Servers via Cooperative Caching," Proceedings of the 2nd Conference on Symposium on Networked Systems Design & Implementation (NSDI '05), 2005, pp. 129-142, USENIX Association, Boston, USA.

Gibson, G., et al., "Parallel NFS Requirements and Design Considerations," Internet Engineering Task Force (IETF) Internet-Draft, Oct. 2004, pp. 1-15, The Internet Society, USA.

Howard, J.H., "An Overview of the Andrew File System," Proceedings of the 1988 USENIX Winter Technical Conference, Feb. 1988, pp. 1-6, USENIX, USA.

Howard, J.H., et al., "Scale and Performance in a Distributed File System," ACM Transactions on Computer Systems (TOCS), Feb. 1988, pp. 51-81, vol. 6, No. 1, ACM, New York, NY, USA.

Muntz, D. et al., "Multi-level Caching in Distributed File Systems—or—Your cache ain't nuthin' but trash," Proceedings of the USENIX Winter 1992 Technical Conference, 1992, pp. 305-313, USENIX, San Francisco, CA, USA.

Satyanarayanan, M. et al., "Coda: A Highly Available File System for a Distributed Workstation Environment," IEEE Transactions on Computers, Apr. 1990, pp. 447-459, vol. 39, No. 4, IEEE Computer Society, USA.

Schmuck, F. et al., "GPFS: A Shared-Disk File System for Large Computing Clusters," Proceedings of the 1st USENIX Conference on File and Storage Technologies (FAST '02), 2002, pp. 231-244, No. 19, USENIX, USA.

Sivathanu, G. et al., "A Versatile Persistent Caching Framework for File Systems," Technical Report FSL-05-05, Dec. 2005, pp. 1-4, Stony Brook University, Stony Brook, NY, USA, downloaded at URL: http://www.fsl.cs.sunysb.edu/docs/cachefs-tr/cachefs.pdf.

Howells, D., "FS-Cache: A Network Filesystem Caching Facility," Red Hat UK Ltd., Oct. 2004, pp. 1-14, Red Hat, United Kingdom, downloaded at URL: http://people.redhat.com/~dhowells/fscache/FS-Cache.pdf.

IBM, "An Overview of OpenAFS Administration," OpenAFS Administration Guide, Apr. 2000, Chapter 1, pp. 1-6, IBM Corporation, USA, downloaded at: URL: http://docs.openafs.org/AdminGuide/ch01s02.html#HDRWQ16.

Blue Coat Systems, "Proxy Caching Technology," located at URL: http://www.bluecoat.com/resources/technology/proxycachingtechnology, downloaded Dec. 14, 2009, pp. 1-6, Blue Coat Systems, Inc., USA.

Expand Networks, "Foundation WAN Optimization," located at URL: http://www.expand.com/generic-wanoptimization/generic-wan-optimization.aspx, download date Dec. 15, 2009, pp. 1-3, Expand Networks, USA.

Lee, Y.K. et al., "Metadata Management of the SANtopia File System," Proceedings of the Eighth International Conference on Parallel and Distributed Systems (ICPADS '01), 2001, pp. 492-499, IEEE, USA.

Zadok, E., et al., "On Incremental File System Development," ACM Transactions on Storage (TOS), May 2006, pp. 161-196, vol. 2, No. 2, ACM, New York, NY USA.

Yasuda, K., "Cache Cooperation for Clustered Disconnected Computers," Proceedings of the Ninth International Conference on Parallel and Distributed Systems (ICPADS '02), 2002, pp. 457-464, IEEE Computer Society, USA.

Mazer, M.S. et al., "Writing the Web While Disconnected," IEEE Personal Communications, Oct. 1998, pp. 35-41 vol. 5, No. 5, IEEE, USA.

Ananthanarayanan, R. et al., "Panache: A Parallel WAN Cache for Clustered Filesystems," ACM SIGOPS Operating Systems Review, Jan. 2008, pp. 48-53, vol. 42, No. 1, ACM, USA.

Boukerche, A. et al., "A Performance Analysis of a Cache-based File Prediction Protocol for Mobile File Systems," Proceedings of the ACM International Workshop on Performance Monitoring, Measurement, and Evaluation of Heterogeneous Wireless and Wired Networks ($PM^2HW^2N$ '06), 2006, pp. 100-104, ACM, USA.

Tang, H., et al., "A Self-Organizing Storage Cluster for Parallel Data-Intensive Applications," Proceedings of the 2004 ACM/IEEE conference on Supercomputing (SC '04), 2004, pp. 52-64, IEEE Computer Society, USA.

Shulman, A., "WAN Application Acceleration for LAN-like Performance," Applications Acceleration Challenge, Aug. 2005, pp. 1-3, Expand Networks and Webtorials, USA.

U.S. Non-Final Office Action for U.S. Appl. No. 12/639,832 mailed Oct. 11, 2012.

Liao, W. et al., "Cooperative Client-Side File Caching for MPI Applications", International Journal of High Performance Computing Applications, May 2007, pp. 144-154, vol. 21, No. 2, Sage Publications, USA.

Farazdel, A. et al., "GPFS on AIX Clusters: High Performance File System Administration Simplified", IBM Redbooks, IBM International Technical Support Organization, Aug. 2001, pp. 1-279, International Business Machines Corporation, USA.

U.S. Non-Final Office Action for U.S. Appl. No. 12/639,865 mailed Nov. 29, 2012.

U.S. Non-Final Office Action for U.S. Appl. No. 13/570,052 mailed Nov. 27, 2012.

U.S. Notice of Allowance for U.S. Appl. No. 12/639,904 mailed Jan. 31, 2013.

U.S. Notice of Allowance for U.S. Appl. No. 12/639,920 mailed Feb. 21, 2013.

U.S. Final Office Action for U.S. Appl. No. 12/639,832 mailed Mar. 26, 2013.

(56) References Cited

OTHER PUBLICATIONS

U.S. Notice of Allowance for U.S. Appl. No. 12/639,865 mailed Mar. 19, 2013.
U.S. Notice of Allowance for U.S. Appl. No. 13/570,052 mailed Apr. 12, 2013.
U.S. Non-Final Office Action for U.S. Appl. No. 12/639,832 mailed Jul. 1, 2014.
U.S. Final Office Action for U.S. Appl. No. 12/639,832 mailed Feb. 12, 2015.
U.S. Notice of Allowance for U.S. Appl. No. 12/639,832 mailed May 8, 2015.
U.S. Non-Final Office Action for U.S. Appl. No. 12/639,904 mailed Oct. 17, 2011.
U.S. Final Office Action for U.S. Appl. No. 12/639,904 mailed Apr. 24, 2012.
U.S. Notice of Allowance for U.S. Appl. No. 12/639,904 mailed Jun. 15, 2012.
U.S. Non-Final Office Action for U.S. Appl. No. 12/639,920 mailed Dec. 19, 2011.
U.S. Final Office Action for U.S. Appl. No. 12/639,920 mailed Jul. 10, 2012.
U.S. Supplemental Notice of Allowability for U.S. Appl. No. 12/639,832 mailed Jun. 26, 2015.

* cited by examiner

SCALABLE CACHING OF REMOTE FILE DATA IN A CLUSTER FILE SYSTEM

CROSS-REFERENCE TO RELATED APPLICATIONS

This patent application is a continuation patent application of U.S. patent application Ser. No. 12/639,832, filed on Dec. 16, 2009, the disclosure of which is incorporated herein its entirety by reference.

BACKGROUND

1. Field of the Invention

The present invention relates generally to data storage. In particular, the present invention relates to scalable caching of remote file data in cluster file systems.

2. Background

Information technology (IT) environments require sharing of large amounts of file data in a consistent, efficient, and reliable manner across a wide-area network (WAN). WAN data storage systems, including cluster file systems, need to scale in capacity and bandwidth to support a large number of client nodes. A Cluster comprises a group of interconnected independent computing nodes working together as a single system. A cluster file system manages data stored within a cluster and provides client nodes with access to all files located on storage devices in the file system. A large cluster file system can scale to petabytes of storage and hundreds of gigabytes of access bandwidth, and needs to provide a consistent cache of data that can be exported by a remote cluster file system.

BRIEF SUMMARY

A method for facilitating access to data in a network is provided. One embodiment comprises maintaining a cache in a local cluster file system and caching local file data in the cache, by fetching file data from multiple nodes on demand from a remote cluster file system into the cache over the network local file data and metadata corresponds to the file data from the remote cluster file system and metadata in the remote cluster file system.

Further, a system for facilitating access to data in a network, is provided. One embodiment comprises a cache subsystem comprising a cache configured for maintaining data for a local cluster file system. The system further comprises a caching layer function configured for caching local file data in the cache by fetching file data on demand from a remote cluster file system into the cache over the network. The local file data corresponds to file data in the remote cluster file system.

Further, a computer program product for facilitating access to data, is provided. The computer program product comprises a computer readable storage medium including computer usable program code embodied therewith. The computer usable program code comprises computer usable program code configured to maintain a cache subsystem configured for maintaining data in a cache for a local cluster file system, and provide a caching layer function by fetching file data in parallel and on demand from the remote cluster file system into the cache over the network. The local file data corresponds to the file data in the remote cluster file system.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for caching of remote file data in an information technology (IT) computing environment, including multiple computing resources, as well as operation and/or component parts thereof. While the following description will be described in terms of caching of remote file data for clarity and placing the invention in context, it should be kept in mind that the teachings herein may have broad application to all types of systems, devices and applications.

A caching cluster file system that implements caching of remote file data in a cluster file system is provided. The system caches data on demand while guaranteeing well defined file system consistency semantics. A preferred embodiment provides a scalable cache architecture for a cache in a file system to cache remote file system data while providing the consistency semantics of a distributed file system. The scalable caching architecture enables the file system to cache remote file system data wherein the cache can scale in capacity and bandwidth similar to a clustered file system. Further, such a cache can support a remote server file system from different vendors. The cached data can be exported and accessed transparently by a file system client for both read and write access. The cache utilizes open, standard protocols for over-the-wire file access. Further the cache can significantly mask network latency and continue to function with network outages.

In an example implementation described below, the scalable caching architecture is integrated with a General Parallel File System (GPFS) clustered file system. The remote data is accessed over a network file system (NFS) so that any remote server exporting data over NFS can be the caching target. To get better performance, the cache can switch to a parallel NFS (pNFS) for data transfer if the remote system exports the data using pNFS. The cache is visible to any file system client as a Portable Operating System Interface (POSIX) compliant file system, thus any file system client can browse the cache and access the data as if it was in a local file system. The cached data can be further exported via NFS to a remote NFS client. NFS can also be substituted by the CIFS (Common Internet file system) protocol.

Figure 1:
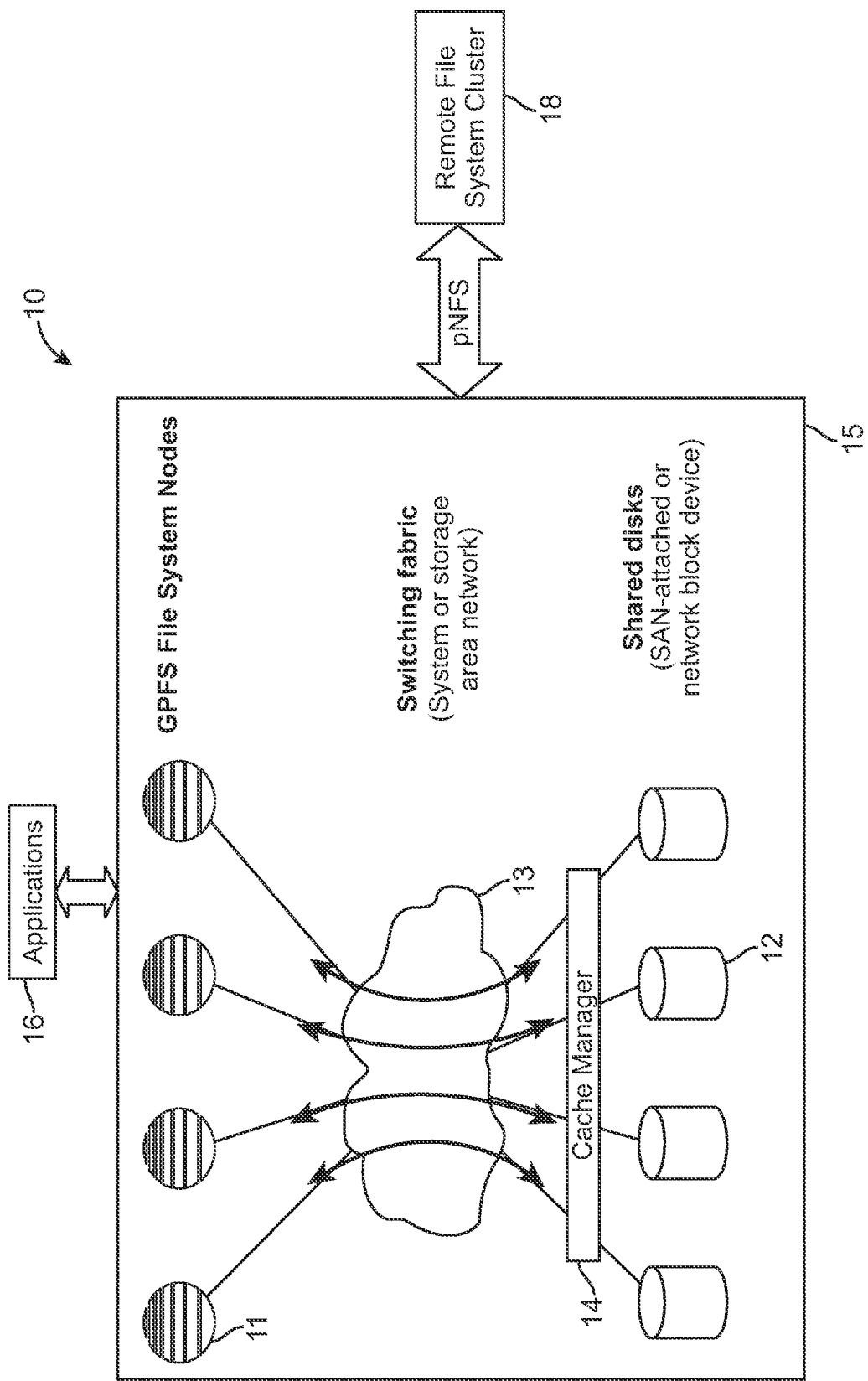
FIG. 1 illustrates a block diagram of a system for caching of remote file data in a local cluster file system.

Referring to FIG. 1, a GPFS parallel cluster file system 10 comprising a local cached file system cluster 15 that stores cached data, wherein pNFS is used to move the data between the cluster 15 and a remote cluster file system 18. GPFS is used for both file system clusters 15 and 18, to provide concurrent high-speed file access across multiple file system computing nodes of a cluster. The cached cluster includes the file system 15, computing nodes 11 (e.g., processors) that support the GPFS file system and the applications 16 that use it. The nodes 11 are connected to storage media 12, such as shared disks or disk subsystems, over a switching fabric 13. A cache manager 14 maintains cached data in the storage media 12. All nodes 11 in the cluster have equal access to all disk 12. Files are striped across all disks 12 in the file system where the number of disks 12 can range from tens to several thousand disks. In addition to balancing the load on the disks, striping achieves the full throughput that a disk subsystem is capable of by reading and writing the blocks in parallel.

The switching fabric 13 that connects file system nodes 11 to the shared disks 12 may comprise a storage area network (SAN) such as fibre channel or iSCSI. Alternatively, individual disks 12 may be attached to some number of I/O server nodes that allow access from file system nodes 11 through a software layer running over a general-purpose communication network, such as IBM Virtual Shared Disk (VSD). Regardless of how shared disks 12 are implemented, the GPFS only assumes a conventional block I/O interface with no particular intelligence at the disks 13. Parallel read-write disk accesses from multiple nodes 11 in the cluster 15 are synchronized to prevent corruption of both user data and file system metadata. The cluster 15 uses distributed locking to synchronize access to shared disks 12. Wherein distributed locking protocols ensure file system consistency regardless of the number of nodes 11 that simultaneously read from and write to a file system on the disks 12 on behalf of an application 16, while at the same time allowing data migration parallelism to achieve maximum throughput.

For remote accesses over a wide area network (WAN), pNFS clients access storage devices in a remote cluster file system in parallel. This is achieved by separating the data and metadata paths, and by moving the metadata server out of the data path. As a result, each pNFS client can leverage the full aggregate bandwidth of the cluster file system. Using pNFS, clients can query the metadata server to determine the layout of how files are distributed across data servers. Layouts are maintained internally by the metadata server. Based on the file layout, the client is able to directly access the data servers in parallel. A pNFS client communicates with the data servers using a variety of storage access protocols, including NFSv4 and iSCSI/Fibre Channel. The pNFS specification allows for the addition of new layout distributions and storage access protocols, in addition to flexibility for implementation of the back-end storage system.

A more detailed description of a cached file system is described below.

Figure 2:
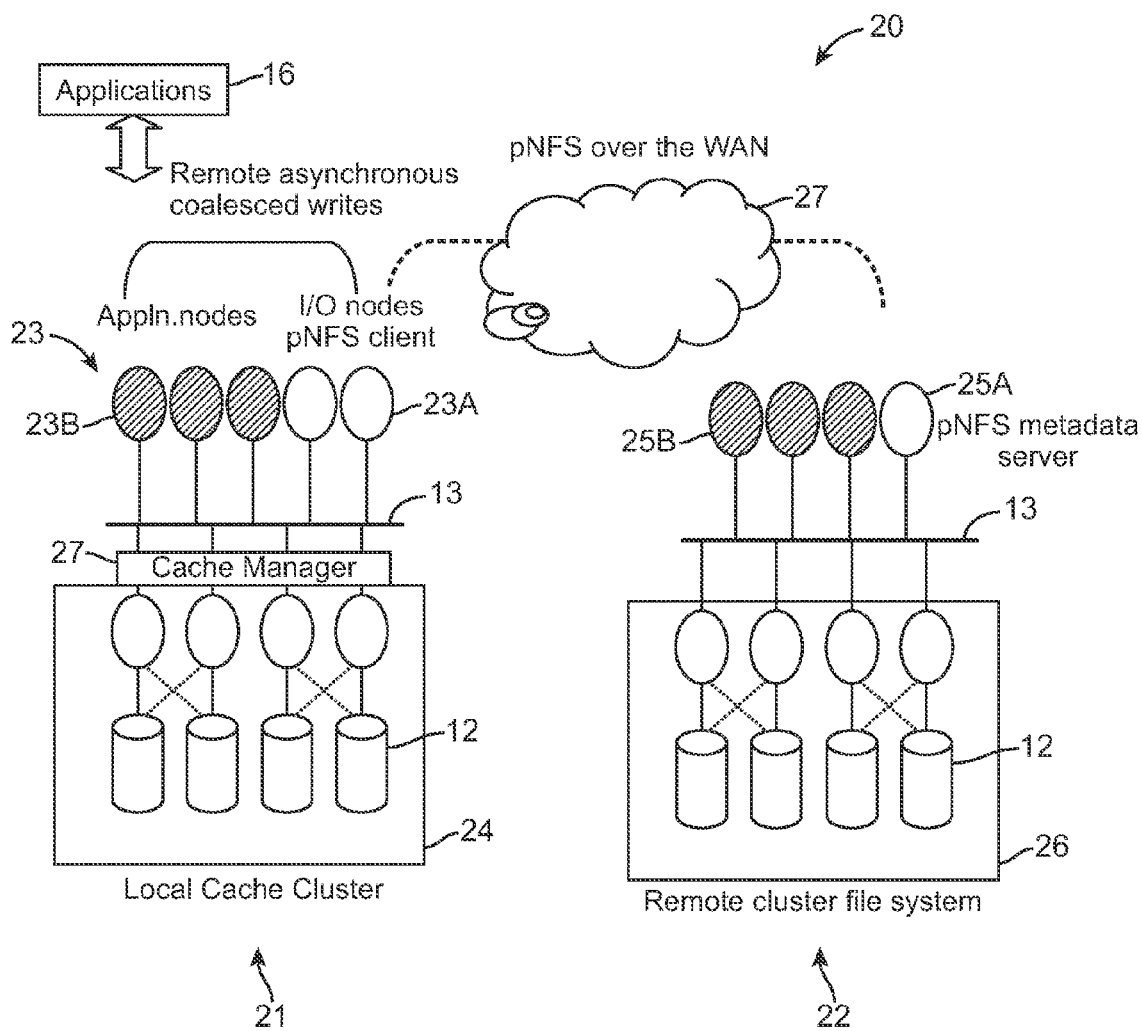
FIG. 2 illustrates a block diagram of a system for caching of remote file data in a cluster file system.

FIG. 2 shows a functional block diagram of an IT system 20. The IT system 20 includes a local cache cluster 21 and a remote cluster file system 22. Every computing node 23 in the cache cluster 21 has the same access to data cached by a local cache file system 24 of the local cache cluster 21. However, only some of the nodes 23 (i.e., I/O nodes 23A) may have the hardware and software support for remote network connectivity. I/O nodes are also called gateway nodes. The I/O nodes 23A act as pNFS clients to fetch the data from the remote cluster 21. The remote cluster 21 may store the data in any POSIX-compliant cluster file system that is exported via pNFS (NFS may also be used but with a performance penalty). The I/O nodes 23A are responsible for reading the data from the remote cluster 21 and writing it to the local cache file system 24 and vice-versa. The other nodes of the cluster (i.e., application nodes 23B) service file access requests of applications 16, by reading and writing the cached data in the local cache file system (i.e., cache) 24. The remote file system 22 similarly includes I/O nodes 25A and application nodes 25B.

The application nodes 23B of the local cache file system 21 are also responsible for forwarding access requests by requesting applications 16 to the I/O nodes 23A (i.e., writes to be synchronized with a remote server node 25A of the remote file system 21, and reads to be fetched from the remote server 25A on a local cache miss).

The split between I/O and application nodes 23A, 23B in the local system 21 is conceptual and any node 23 in the local cluster 21 can function both as an I/O node or an application node based on its configuration. The I/O nodes 23A can be viewed as the edge of the cluster cloud that can communicate with the remote cluster 22 while the application nodes 23B interface with the applications.

To access the remote data consistently, the system 20 associates a cache state with every object in the local cache file system 24, wherein the cache state includes the NFS file handle and inode (e.g., data structure) attributes of the corresponding object in the remote file system 26. As multiple nodes 23 in the local system 21 can be accessing the cached data in the local cached file system 24, the accesses may be serialized by a standard GPFS distributed lock management with one of the nodes 23 being the token manager and issuing read and write tokens. The data can be concurrently written at the remote file system 26 of the remote cluster 22, and at the local cache file system 24 of the local cache cluster 21. Between the remote cluster 22 and the local cache cluster 21, the system 20 supports the well known close-to-open consistency guarantees provided by NFS. To reduce the frequent checking of cached attributes with the remote file system 26, the I/O nodes 23A leverage the read and write delegation support of NFSv4. With delegations, the pNFS server 25A of the remote cluster 22 can transfer the ownership of a file to the local cache cluster 21, so that the local cache cluster 21 can safely assume that the data is valid and service local requests.

A cache manager 27 integrated into local cache file system 24 intercepts the application file access requests, wherein the applications simply experience the local cache file system 24 as a traditional GPFS file system. The cache manager 27 of the local cluster 21 mimics the same namespace as the remote cluster 22. Thus browsing through the cache cluster 21 will show the same listing of directories and files as the remote cluster 22. The caching function can be further exported via NFS to enable access by NFS clients. Example file system operations are now described, including Open/Close operations, Data Read operations and Data Write operations.

Open/Close Operations

Figure 3:
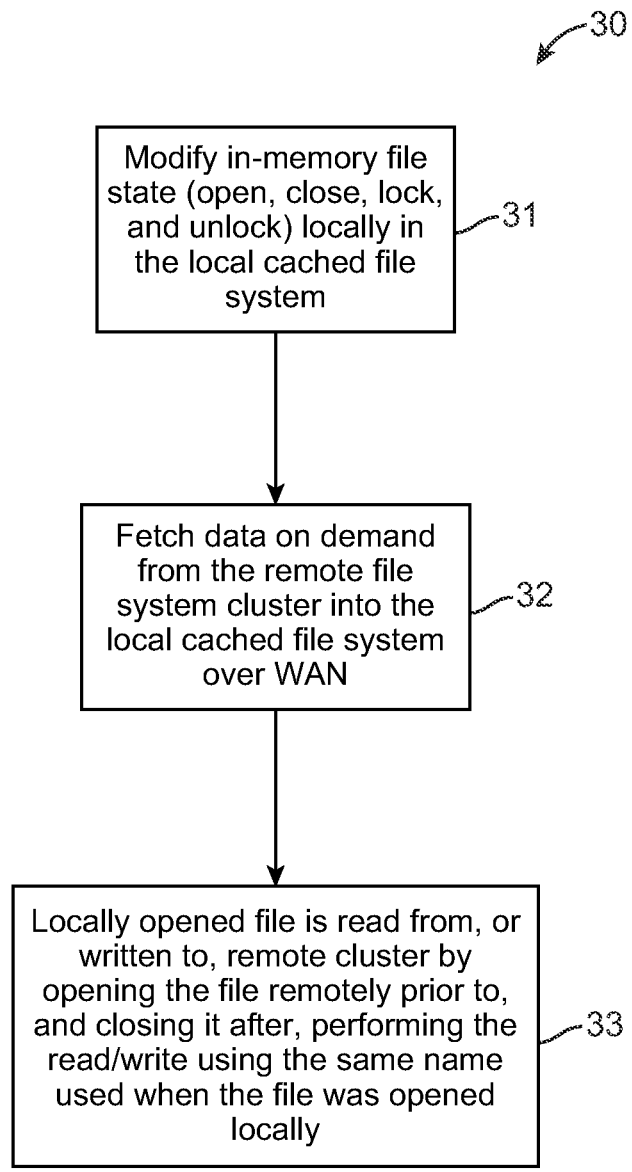
FIG. 3 illustrates an example open/close operation process in a local cached file system cluster that is caching data for a remote cluster file system.

FIG. 3 illustrates an example open/close operation process 30. File operations that modify in-memory file state (e.g., open, close, lock, and unlock), are performed by the cache manager 27 locally in the local cached file system 24 without consulting the remote server 22 (block 31). The cache manager 27 functions as a file system, with the remote cluster 22 being primarily used as a source of data that is fetched on demand into the local cached file system 24 from the remote cluster 22 over WAN (block 32). When a locally opened file needs to be read from, or written to, the remote server 25A of the remote cluster 22, an I/O node 23A opens the file remotely prior to, and closes it after; performing the read/write using the same name used when the file was opened locally (block 33).

The files are typically read and written in their entirety using whole file caching and write coalescing, respectively. In a typical usage scenario, intersite conflicts are expected to be minimal and continued operation is required in the face of WAN outages (similar to an NFSv4 client handling of its file state in the presence of delegations).

The system allows disconnected operations, wherein user processes (applications) supported by the local cluster 21, may continue to function in the absence of network connectivity to the remote cluster 22.

Data Read Operations

Figure 4:
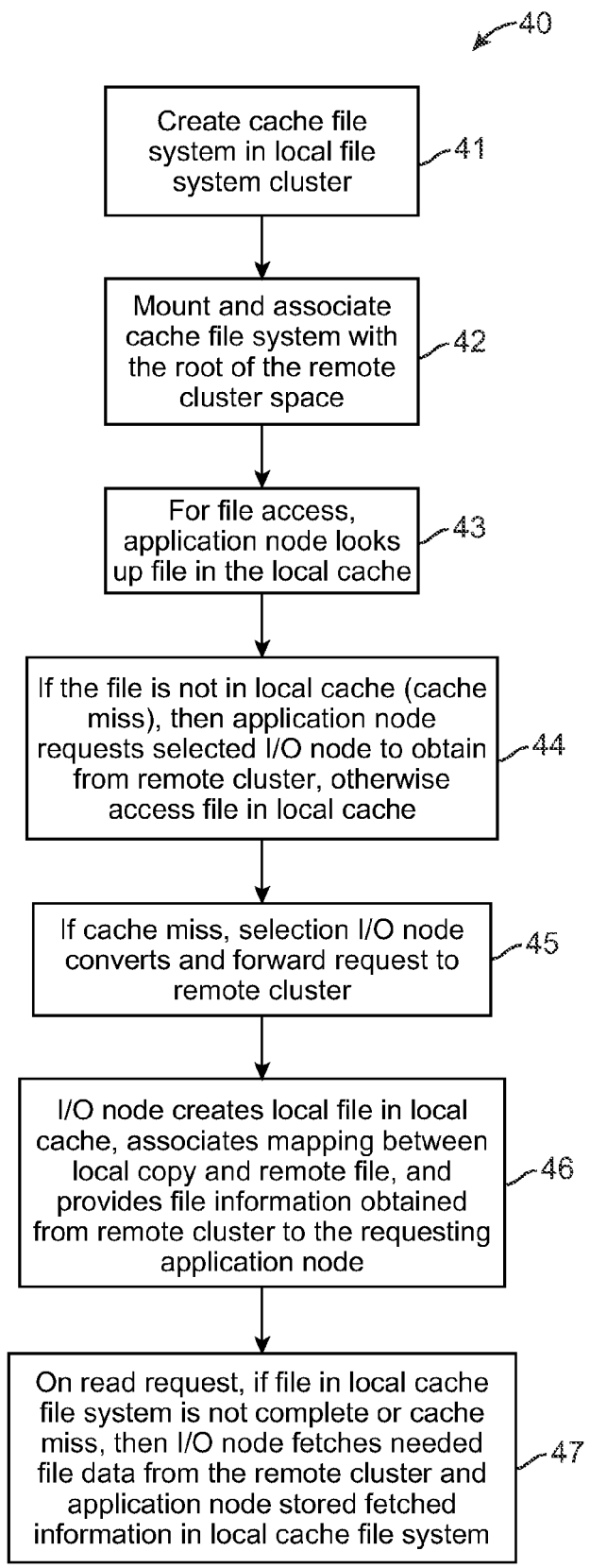
FIG. 4 illustrates an example read operation process in a local cached file system cluster that is caching data for a remote cluster file system.

FIG. 4 illustrates an example data read operation process 40. The cache file system 24 is initially created in the local cluster 21, and contains no data (block 41). When mounted, the cache file system 24 is associated with the root of the remote cluster exported space using a mount operation (block 42). When an object such as a file is first accessed by an application node 23B of the local cluster 21, a result of a user-invoked opened on a file or a directory (i.e., via a GPFS lookup request), the cache manager 27 performs a (VFS) lookup or read directory (i.e., readdir) operation in the local cache 24 (block 43). If the object is not found in the local cache file system (as the case would be on an initialized cache file system), the application node 23B requests a selected I/O node 23A to service the request from the remote cluster 22 (block 44). The selection of I/O node 23A is based on a hashing function that ensures that requests for an object are always sent to the same I/O node 23A.

The selected I/O node 23A converts a GPFS lookup request to an NFS LOOKUP request and forwards it to the remote cluster 22 to obtain the file information (block 45). On success in obtaining file information from the remote cluster 22, the I/O node 23A creates the object in the local file system cache 24 via the cache manager 27, associates a mapping between the local GPFS inode and the remote cluster (or home cluster) state (the cache is local but it contains information of the remote object (object modification times, unique identifier, etc.)). The I/O node 23A provides the obtained file handle and attributes of the object to the application node 23B and returns success status back to the application node 23B (block 46). In effect, once the lookup operation completes successfully, the object would have been created in the local cache file system 24 but would not contain any data. The state associated with a cached object indicates if the object is incomplete or empty.

On an application read request, in block 47 the application node 23B first checks with the cache manager 27 to determine if the object exists in the local cache file system 24. If the object exists but is empty or incomplete (i.e., a cache miss), the application node 23B requests the designated I/O node 23A to fetch the data from the remote cluster 22. The I/O node 23A, based on a prefetch policy, fetches/retrieves the entire file or the requested bytes from the remote cluster 22 (via pNFS over WAN) and writes the fetched information in the local cache file system via the cache manager 27. If only a portion of the file (object) was retrieved from the remote cluster 22, then the rest of the file may be prefetched asynchronously after the application request is completed.

The system 20 supports both whole file and partial file caching (segments including a set of contiguous blocks). The application node 23B, when notified of completion, reads the requested bytes from the local cache 24 via the cache manager 27 and returns it to a requesting application 16 as if the requested data file (i.e., object) was present in the local cluster 21 all along. It should be noted that the I/O and application nodes 23A, 23B only exchange request and response messages while the actual data is accessed locally by the cache manager 27 via the shared disks 12. Thereafter, if said previously requested file (object) is read again, the application node 23B checks via the cache manager 27 if the complete valid object exists in the local cache 24. On a cache hit, the application node 23B can itself service the file read request from the local cache 24 via the cache manager 27. The system 20 uses file and directory attribute checking, performed by an NFS client at the I/O node 23A to guarantee close-to-open consistency of the data in the local cache 24 of the local cluster 21, with the file system 26 of the remote cluster 22. All the "read class" of requests which include lookup, get attribute (getattr) and read, follow a similar data flow. These requests can be considered synchronous on a cache miss, because the application is blocked waiting for the response back from the I/O node 23A.

Data Write Operations

Figure 5:
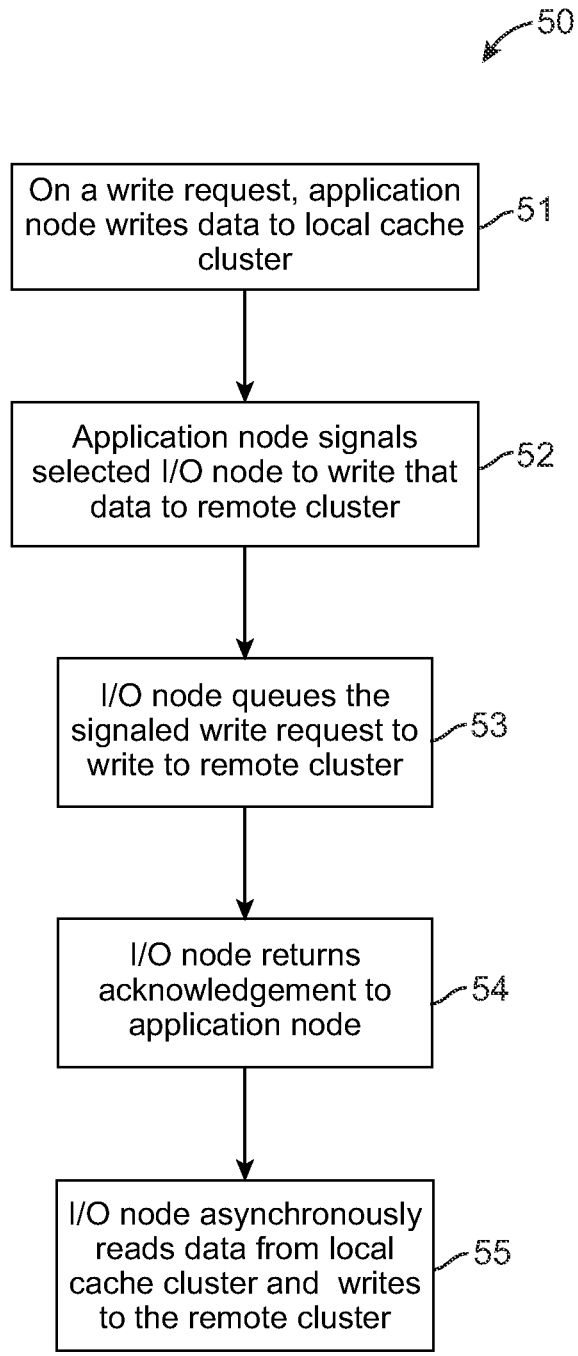
FIG. 5 illustrates an example write operation process in a local cached file system cluster that is caching data for a remote cluster file system.

FIG. 5 illustrates an example data write operation process 50. On a write request, the application node 23B first writes the data to the local cache 24 via the cache manager 27 (block 51), and then sends a message to the designated I/O node 23A to perform the write operation at the remote cluster 22 (block 52). The I/O node 23A queues the request (block 53) and returns acknowledgement immediately, allowing the requesting application 16 (e.g., user process) to complete (block 54). At a later time, the I/O node 23A reads the data from the local cache 24 and completes the remote write asynchronously (block 55). The cache read provides better performance as it avoids both network latency and the limited WAN network bandwidth. The cache read provides better throughput and low latency as the data is locally resident. A remote write operation is sent as an NFS operation to the remote (or home) cluster where the data is written to the home cluster file system. This is performed for all "write class" of requests such as; create, make directory (mkdir), write and unlink. Since data modifying operations are performed asynchronously, optimizations such a write coalescing and elimination of transient creates may be performed.

As such, an implementation of a preferred embodiment of the system according to the invention comprises a remote file data caching module integrated with the GPFS cluster file system, providing a scalable, multi-node, consistent cache of data exported by a remote file system cluster. The example system uses the pNFS protocol to move data in parallel from the remote file cluster. Furthermore, the system provides a POSIX compliant file system interface, making the cache completely transparent to applications. The system can mask the fluctuating wide-area-network (WAN) latencies and outages by supporting asynchronous and disconnected-mode operations. The system allows concurrent updates to be made at the cache and at the remote cluster and synchronizes them by using conflict detection techniques to flag and handle conflicts. The system may rely on open standards for high-performance file serving and does not require any proprietary hardware or software to be deployed at a remote cluster.

The cache manager 27, gateway nodes 23A and application nodes 23B collectively provide a caching layer integrated into the local GPFS cluster file system 21 that can persistently and consistently store data and metadata exported by the remote cluster 22 across a wide-area network 27. Since every node 23 has direct access to cached data and metadata in the file system 24, once data is cached, applications 16 running on the cached cluster 21 achieve the same performance as if they were running directly on the remote cluster 22. Furthermore, NFS clients can access the cache 24 in cached cluster 21 and see the same view of the data (as defined by NFS consistency semantics) as NFS clients directly access the data from the remote cluster 22. In essence, both in terms of consistency and performance, applications 16 can function as if there was no cache 24 and WAN 27 in between the applications 16 and the remote cluster 22. More importantly, the caching layer 27 can function as a standalone file system cache. Thus applications 16 can run on the cache cluster 21 using POSIX semantics and access, update, and traverse the directory tree even when the remote cluster 22 is offline.

The caching layer 27 can operate on a multi-node cluster (henceforth called the cache cluster) where all nodes need not be identical in terms of hardware, operating system (OS), or support for remote network connectivity. The nodes 23B of the cache cluster 21 see a shared storage 24, either by connecting to SAN attached storage or relying on a Network Shared Disk layer that enables all nodes in a GPFS cluster to "access" direct attached storage on another node in the cluster, as if it were local. Only a set of designated I/O nodes 23A (Gateway nodes) need to have the hardware and software support for remote access to the remote cluster 22. The nodes 23A internally act as NFS/pNFS clients to fetch the data in parallel from the remote cluster 22. Parallel NFS can be used if the remote cluster file system 22 provides support, otherwise NFSv4 can be used. As noted, the remaining nodes 23B of the local cached cluster 21 called (Application nodes) service the data requests of applications 16 from the local caches cluster 21.

The I/O nodes 23A communicate with each other via internal remote procedure call (RPC) requests. As the application nodes 23B service data requests by the requesting applications 16, whenever an application request cannot be satisfied by the cache 24 (due to a cache miss or when the cached data is invalid), an application node 23B sends a read request to one of the I/O nodes 23A which accesses the data from the remote cluster 22 on behalf of the application node 23B.

Different mechanisms can be implemented for the I/O nodes 23A to share the data with the application nodes 23B. One option is for the I/O nodes to write the remote data to the shared storage 12, which application nodes can then access and return the data to the applications 16. Another option is for the I/O nodes to transfer the data directly to the application nodes using the cluster interconnect. In the first option, data sharing occurs through the storage subsystem 12, which can provide higher performance than a typical network link. All updates to the cache 24 are also made by the application nodes 23B via the cache manager 27 and a command message (again no data) is sent to the I/O node 23A and queued.

Figure 6:
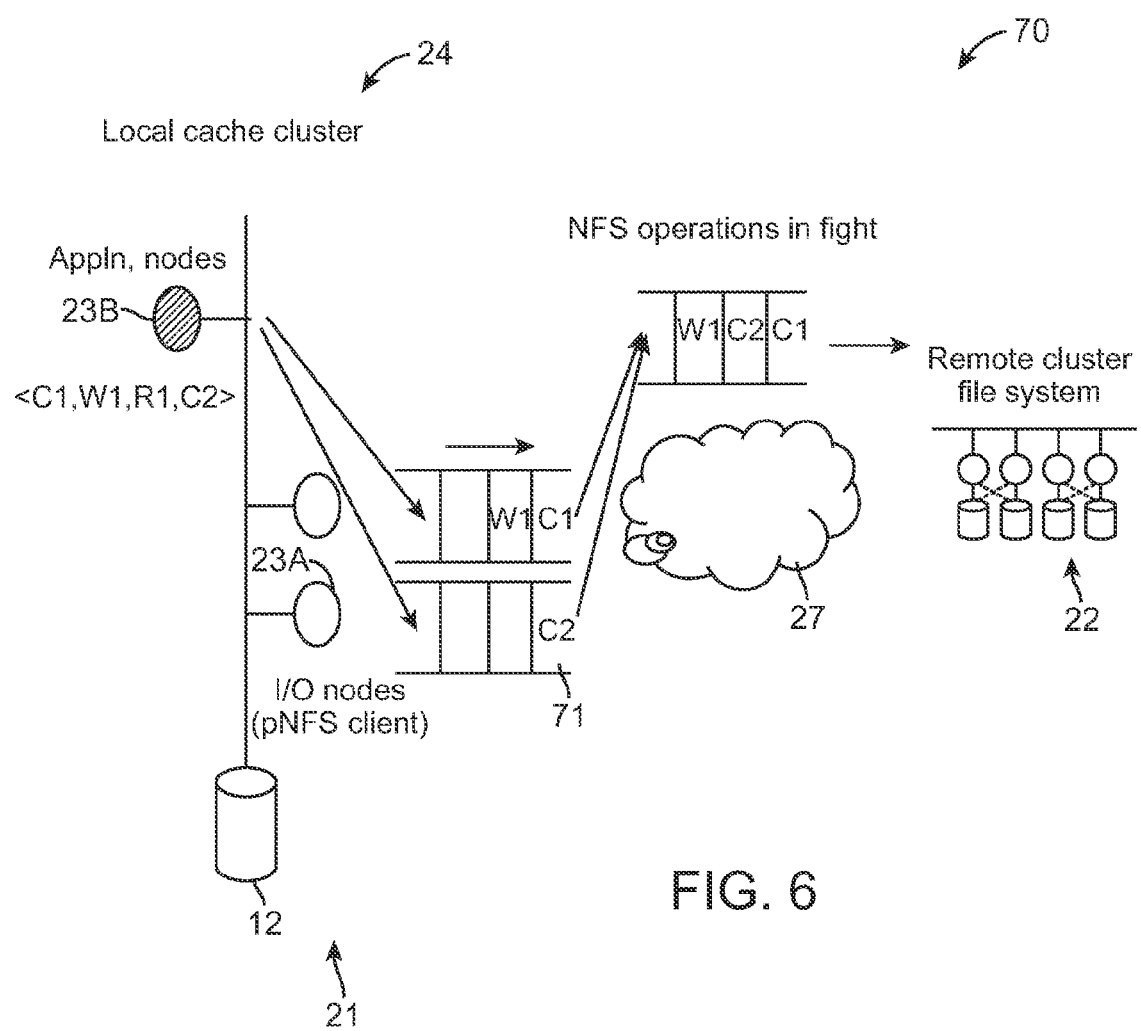
FIG. 6 illustrates build up of data access operation queues at gateway nodes of a local cached file system cluster.

FIG. 6 shows an example process 70 illustrating build up of queues 71 at the I/O nodes 23A for asynchronous requests sent by an application node 23B (i.e., create, write requests made at one of the application nodes 23B). These requests are queued at the designated I/O node 23A before being sent to remote cluster 22, wherein in FIG. 6 Ci, Ri and Wi indicate create, read and write for file i respectively. At a later time, the I/O node(s) 23A read the data in parallel from the storage subsystem 12 and push it to the remote cluster 22 over pNFS 27. The selection of an I/O node 23A to service a request ensures that dependent requests are executed in the intended order. To provide node affinity, as a first step, an application node 23B selects an I/O node 23A using a hash function based on a unique identifier of the object on which a file system operation is requested. Coordination for operations that are based on a name (e.g., lookup, create, remove etc.) and operations that affect multiple objects (e.g., rename, link), are provided. Each I/O node 23A maintains an in-memory queue of operations that need to be sent to the remote cluster 22. All the file system operations, from the point of view of the cache 24, fall into two classes: synchronous (i.e., those that require the request to block until the remote operation completes and returns, e.g., read, lookup), and asynchronous (i.e., those that can proceed without the remote operation completing, e.g., create, write). Each I/O node can delay asynchronous operations for a configurable duration of time.

Data consistency can be controlled across various dimensions and can be defined relative to the cache cluster 21, the remote cluster 22 and the network connectivity. The cached data in the cache 24 is considered locally consistent if a read from a node of the cache cluster 21 returns the last write from any node of the cache cluster 21. A validity lag is defined as the time delay between a read at the cache cluster 21 reflecting the last write at the remote cluster 22. A synchronization lag is defined as the time delay between a read at the remote cluster 22 reflecting the last write at the cache cluster 21.

Using GPFS distributed locking mechanism, the data cache is locally consistent for the updates made at the cache cluster 21. The accesses are serialized by electing one of the nodes 23 to be the token manager and issuing read and write tokens. Local consistency within the cache cluster 21 translates to the traditional definition of strong consistency. For cross-cluster consistency across the WAN 27, the local cluster 21 allows both the validity lag and the synchronization (or synch) lag to be tunable based on the workload requirements. Basic NFS close-to-open consistency can be achieved by setting the validity lag to zero on a file open (i.e., the data is always validated with the remote cluster 22 on an open command) and setting the synch lag to zero on a file close (i.e., cache writes are flushed to the remote cluster 22 on a close). NFS uses an attribute timeout value (typically 30 seconds) to recheck with the server if the file attributes have changed. The validity lag is bounded by this attribute timeout value or set explicitly as a parameter.

The synch lag can also be set to NFS semantics or set explicitly as a parameter. However, NFS consistency semantics can also be strengthened via the O DIRECT parameter (which disables NFS client caching) or by disabling attribute caching (effectively setting the attribute timeout value to 0). NFSv4 file delegations can reduce the overhead of consistency management by having the remote cluster 22 NFS/pNFS server transfer ownership of a file to the cache cluster 21 so that the cache 24 can safely assume that the data is valid and service local requests.

When the synch lag is greater than zero, all updates made to the cache 24 are asynchronously committed at the remote cluster 22. The semantics will no longer be close-to-open as data writes regardless of the file close time delay. When the network is disconnected both the validation lag and synch lag become indeterminate. When connectivity is restored, the cache and remote clusters are synchronized, with conflicts being detected and resolved.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 7:
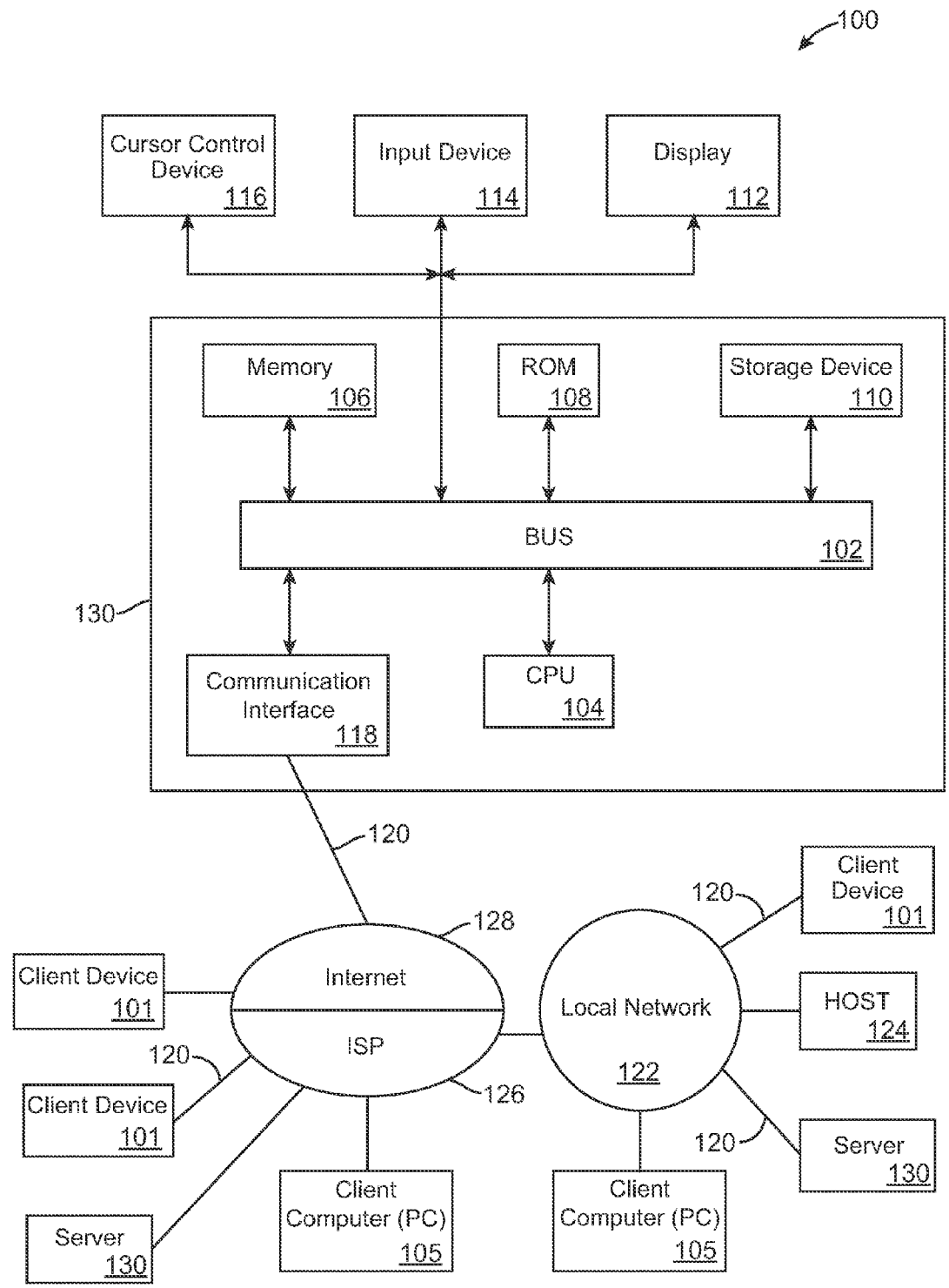
FIG. 7 illustrates a system in which scalable caching of remote file data in a cluster file system may be implemented.

FIG. 7 shows a block diagram of an example architecture of an embodiment of a system 100. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein.

One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g., as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for facilitating access to data in a network, comprising:
   maintaining a cache in a local cluster file system; and
   caching local file data in the cache using an integrated caching layer for fetching file data in parallel and on demand from a remote cluster file system into the cache over the network, wherein the caching layer operates on a multi-node cache cluster and stores data and metadata exported by the remote cluster file system across the network;
   wherein the local file data and metadata corresponds to the file data from the remote cluster file system and metadata in the remote cluster file system, the cache is visible to file system clients as a Portable Operating System Interface (POSIX) compliant file system, the caching layer performing as a standalone file system cache wherein applications execute on the multi-node cache cluster using POSIX semantics via a POSIX compliant file system interface, the applications access, update, and traverse a directory tree for the remote cluster file system even when the remote cluster file system is offline, and data cache is locally consistent for updates made at the multi-node cache cluster using distributed locking for the data cache.

2. The method of claim 1, further comprising:
   upon detecting that a requested file data is not in the cache, fetching, by the caching layer, file data on demand from the remote cluster file system in parallel into the local cached file system over the network.

3. The method of claim 1, further comprising:
   transferring, by the caching layer, locally modified file data from the cache to the remote cluster file system over the network.

4. The method of claim 1, wherein caching local file data in the cache further includes:
   receiving a request for file access by an application node of the caching layer, wherein the application node checks the cache for the requested file; and
   upon detecting a cache hit, the application node accesses the file data in the cache.

5. The method of claim 4, wherein caching local file data in the cache further includes:
   upon detecting a cache miss, fetching, by the caching layer, file data on demand from the remote cluster file system into the cache over the network, wherein fetching file data on demand includes the application node signaling a gateway node of the caching layer to fetch the file data and the gateway node fetching the file data from the remote cluster file system into the cache in parallel over the network for access by the application node.

6. The method of claim 5, wherein fetching the file data from the remote cluster file system further includes:
   fetching the file data from the remote cluster file system into the cache over a wide area network using a parallel network file system data transfer, wherein each node in the multi-node cache cluster has direct access to cached data and metadata in the cache.

7. The method of claim 6, wherein the local cluster file system and the remote cluster file system comprise General Parallel File Systems, the cache comprises a storage subsystem of the local cluster, data cache is locally consistent for updates made on the multi-node cache cluster, and accesses are serialized by a particular node that is elected as a token manager that issues read and write tokens.

8. The method of claim 2, wherein the cache switches to a parallel network file system (pNFS) for data transfer for remote systems that export the data using pNFS.

9. The method of claim 8, wherein a cached state is associated with every object in the local cached file system, the multi-node cache cluster provides a tunable validity lag and a tunable synchronization lag based on workload requirements, and close-to-open consistency is achieved by setting the validity lag to zero on an open file command and setting the synchronization lag to zero on a file close command.

10. The method of claim 9, wherein the cache state comprises a file handle and inode attributes of a corresponding object in the remote cluster file system, concurrent data updates are made at the cache and the remote cluster file system, and the concurrent updates are synchronized to the cache and the remote cluster file system using conflict detection to flag and handle conflicts.

11. The method of claim 6, wherein the caching layer comprises a cache manager, multiple gateway nodes and multiple application nodes, and the caching layer is integrated into a local General Parallel File System cluster file system.

12. The method of claim 9, wherein the validity lag comprises time delay between a read at the multi-node cache cluster reflecting a last write at the remote cluster file system, and the synchronization lag comprises time delay between a read at the remote cluster file system reflecting a last write at the multi-node cache cluster.

* * * * *